United States Patent Office 2,899,360
Patented Aug. 11, 1959

2,899,360

EXTRACTION OF VITAMIN $B_{12}$ FROM MICROBIAL MATERIALS

Robert A. Fisher, Bakersfield, Calif., assignor, by mesne assignments, to Olin Mathieson Chemical Corporation, New York, N.Y., a corporation of Virginia No Drawing. Application December 17, 1954
Serial No. 476,089

12 Claims. (Cl. 167—81)

My invention relates to a novel and useful method for the extraction of vitamin $B_{12}$ from microbial materials containing the same, notably bacteria cells, fermentation residues, and combinations thereof.

Vitamin $B_{12}$ exists in natural materials in relatively minute amounts, namely, at levels of a few parts per million. Thus the vitamin $B_{12}$ must usually be extracted from natural materials to effect a concentration thereof to a point where the viamin $B_{12}$ is biologically and commercially useful. Heretofore, known methods for the extraction of vitamin $B_{12}$ from natural crude materials have generally suffered one or more significant disadvantages, such as emulsification or like physical difficulties, and the extraction of large quantities of non-vitamin $B_{12}$ substances along with the vitamin $B_{12}$ which necessitates many further steps of concentration and purification to obtain a really useful pharmaceutical vitamin $B_{12}$ product. The use of a large number of purification steps normally results in substantial losses of vitamin $B_{12}$ as, for example, through destruction by prolonged contact with impurities and through physical losses suffered in solvent-solvent transfer and solvent washing steps.

According to the method of my present invention, vitamin $B_{12}$ is extracted from microbial material by direct contact of the microbial material with an organic solvent, hereafter described, under conditions where the vitamin $B_{12}$ is transferred from the microbial material to the solvent under optimum conditions of pH and temperature whereby to make for substantially complete recovery of the vitamn $B_{12}$. The vitamin $B_{12}$-rich solvent is then evaporated to a small volume. At this point the residue solvent is diluted with water and filtered. This unique process removes in one step large quantities of non-vitamin $B_{12}$ matter making it possible to complete purification of the vitamin $B_{12}$ in relatively few steps. The advantages of my method are simplicity, ease and speed of handling, and the production of vitamin $B_{12}$ in concentrated or crystalline form with a minimum of purification steps. A further advantage of my invention is the avoidance of solvent-solvent transfer steps in the initial phase of the process, which usually incur emulsification and foaming difficulties. An additional advantage is the avoidance of the use of vitamin $B_{12}$ adsorbing materials which are commonly employed to effect concentration of vitamin $B_{12}$ and reduce the operating volume in early steps of some processes. The use of adsorbing materials generally complicates process handling and results in losses of vitamin $B_{12}$.

I find it advantageous to employ an aqueous solution of isopropanol as an extraction medium for the initial extraction of vitamin $B_{12}$ from microbial material containing the same. Other extraction solvents, particularly aliphatic alcohols such as methanol, ethanol, or n-propanol, may be used for this extraction, but isopropanol is especially advantageous. For optimum extraction of the vitamin $B_{12}$, the amount of water added to the isopropanol should be controlled due to the fact that proportionately larger quantities of non-vitamin $B_{12}$ matter are extracted as the amount of water added is increased. Some water, however, is required to effect extraction of vitamin $B_{12}$ from microbial material. These effects are shown in Table 1.

TABLE 1

| Extracting solvent | Vitamin $B_{12}$ extracted from dry bacteria in 1 extraction | |
|---|---|---|
| | Percent | Mcgs. per gram extracted solids |
| 99% isopropanol | 5 | 5 |
| 90% aqueous isopropanol | 55 | 790 |
| 80% aqueous isopropanol | 71 | 650 |
| 70% aqueous isopropanol | 71 | 612 |
| 60% aqueous isopropanol | 71 | 490 |

The use, for instance, of 80% aqueous isopropanol (that is, a solution containing 80% isopropanol and 20% water, by volume) results in rapid extraction of vitamin $B_{12}$ from microbial material. In 10 minutes contact between said solvent and dry microbial material at 25 degrees C., 87% of the vitamin $B_{12}$ content is in the solvent phase. In 20 minutes, this figure is 94%, and in 30 minutes the transfer of vitamin $B_{12}$ to the said solvent is complete. In the light of the foregoing Table 1, it will be seen that the use of 70–90% aqueous isopropanol represents an especially advantageous type of solvent. In general, the extraction mixture of water and isopropanol may have a water content ranging from about 5% to about 40% by volume of the total mixture of water and isopropanol, and all or a part of said water content may come from microbial material to be extracted.

Vitamin $B_{12}$ generally exists in nature in a form that is devoid of a coordinated cyano group. This form has been designated vitamin $B_{12a}$ (Kaczka, E. A., et al., J.A.C.S., 73, 3569–73 (1951)), and it has been found to be less stable than vitamin $B_{12}$ in aqueous solvent systems. For this reason, it is advantageous in the practice of my invention to add a substance of a type known to stabilize vitamin $B_{12a}$. For example, a source of cyanide ions may be added to convert vitamin $B_{12a}$ to vitamin $B_{12}$ (cyanocobalamin); or a source of sulfite ions, such as sodium metabisulfite, may be added to form a compound known as sulfatocobalamin (see, J.A.C.S. article, supra). An illustration of the effect exerted by these compounds is shown in Table 2.

TABLE 2

Extracting solvent: Vitamin $B_{12}$ extracted, mcgs.
80% Aqueous Isopropanol _____ 182
Same, plus 0.05% sodium cyanide, w./v. ___ 316
Same, plus 1.0% sodium metabisulfite, w./v. __ 328

The minimum quantity of these materials which may be used to stabilize vitamin $B_{12}$ is 0.01% sodium cyanide and 0.1% sodium metabisulfite, although the amounts used should be adjusted to the nature of the crude vitamin $B_{12}$ carrying material. When using a source of cyanide ions, the pH of the extraction should be approximately 7; while, with sodium metabisulfite, the pH of the extraction should be approximately 5.5.

The extraction of vitamin $B_{12}$ from microbial material may be carried out with stirring at ambient temperatures for microbial material which has been dried in such a manner as to burst the cells, as on a drum drier. For materials containing intact cells, such as a concentrated bacterial cream, or filter cake, the extraction of vitamin $B_{12}$ is advantageously carried out at elevated temperatures, generally at least 60 degrees C., or at or near the boiling point of the extraction mixture for a period of 15 to about 30 minutes. Higher temperatures or unduly long extraction periods at the higher temperatures may result in destruction of vitamin $B_{12}$ and should, therefore, be avoided.

The ratio of solvent to crude material may be as low as that ratio permitting the extraction mixture to be vigorously stirred or agitated. With dry bacterial cells, fermentation residues, or filter cakes this ratio is generally a minimum of about 3 parts solvent by volume to 1 part dry material by weight. With concentrated bacterial cell creams, this ratio is a minimum of about 2 parts 99% isopropanol by volume to 1 part cell cream by volume. It will be noted that in the case of concentrated bacterial cell creams the required water is already available in the cell cream, and it is advantageous to use 99% isopropanol as the solvent. In general, good results are obtained where 1 part of the microbial material is extracted with from about 3 to about 10 parts by weight of the aqueous isopropanol.

If it is desired to extract 100% of the vitamin $B_{12}$ content of microbial material, it will be necessary to carry out multiple successive extractions. In a typical case, 65.2% of the vitamin $B_{12}$ content of a dry bacterial powder was removed in the first extraction, 34.0% was removed in the second extraction, and 0.8% in the third extraction. In practice, it may be desirable to limit the extractions in favor of (1) restricting the solvent volume to be processed, and (2) production of a by-product which contains sufficient vitamin $B_{12}$ to render it attractive as a supplement to agricultural feeds. This is the case illustrated in Example 1, hereafter set forth.

At the conclusion of the extraction steps, the vitamin $B_{12}$ rich solvent may be separated from the spent microbial material by such conventional means as centrifuging or filtering. The extracted microbial material may be recovered by drying.

The vitamin $B_{12}$ rich solvent is then evaporated. The evaporation step may be carried out to dryness but it is particularly preferred that the vitamin $B_{12}$ rich solvent be reduced, by such evaporation, to between about 5% and 15%, advantageously between 5% and 10%, of the original volume. The evaporation step is preferably conducted under reduced pressure and the temperature is best maintained at about ambient temperature and, in any event, should not be allowed to rise above about 70 degrees C., certainly for any prolonged periods of time. The evaporated mass or, in other words, the sludge obtained as a result of the evaporation, is then advantageously cooled, if necessary, to about ambient temperature, and admixed with from about 1 to about 4, preferably 2 to 3, volumes of cold water. This evaporation step and the step of adding water are important steps in the practice of the over-all method of my invention because they bring about a separation of non-vitamin $B_{12}$ impurities in such a way that said impurities may be filtered out or removed by a simple skimming operation. If the extent of evaporation is such as to leave appreciably more than 15% of the original volume of the vitamin $B_{12}$ rich solvent, the undesired impurities remain to a large extent in the solution and are not removed therefrom upon the addition of the water. The quantity of water added to the evaporated mass must be such as to throw out of solution the lipid, sterol and other matter, and preferably a maximum thereof, which would interfere with later purification steps. Too great a quantity of water, however, tends to bring about the formation of slimes or curds which complicate the recovery of vitamin $B_{12}$. In general, up to about 3 to 4 volumes of water may be added before formation of slimes, although this characteristic varies somewhat with the origin of the microbial material. From 10 to 20% w./v. of a water-soluble salt such as ammonium sulfate or anhydrous sodium sulfate may be added to facilitate separation of water-insoluble material.

Water-insoluble non-vitamin $B_{12}$ matter may be removed from the vitamin $B_{12}$ rich water solution by filtration or skimming the surface and water washing the scum. The water wash may be combined with the original solution and the scum can be discarded. The vitamin $B_{12}$ rich water solution may then be filtered by conventional means, preferably on a bed of filter aid such as "Celite 505." The filter cake may be washed with water, but the washings should be kept separate to avoid dilution of the main filtrate, which dilution would cause further precipitation of non-vitamin $B_{12}$ matter.

The vitamin $B_{12}$ rich filtrate may then advantageously be passed through a column packed with activated aluminum oxide, which has been washed with acid water, preferably to a pH of about 4. The volume of the column should best be 1 to 20 to 30 volumes of filtrate. The column may be regenerated by treatment with 10-normal sodium hydroxide followed by sulfuric acid to restore an operating pH of about 4.

The column will retain large quantities of non-vitamin $B_{12}$ impurities, but will not adsorb vitamin $B_{12}$. The effluent from the column should be collected during the time that it shows color. When the vitamin $B_{12}$ rich filtrate has been passed over, the filter cake washings should be run through. The colored effluents may be combined. The pH of the effluents should be adjusted to about 5.5 with sodium hydroxide.

The vitamin $B_{12}$ rich column effluent may then be treated with a conventional solvent-solvent transfer, such as water to 50% phenol, 50% benzene and back to water by the addition of 1 volume chloroform and 0.2 volume n-butanol. The water extract may be washed with 55% chloroform, 45% acetone, or with ether, and then evaporated to a heavy sirup. By means of my invention and the very simple solvent purification steps outlined above, I have been able to produce vitamin $B_{12}$ concentrates containing 15–16% vitamin $B_{12}$ by weight of solids. Such a concentrate may very easily be triturated with mannitol or calcium phosphate dibasic to form a pharmaceutically elegant red product for oral use containing 1 milligram vitamin $B_{12}$ per gram. Alternatively, the concentrate may be subjected to crystallization from acetone to produce a crystalline vitamin $B_{12}$ product.

The following examples are illustrative of the practice of my invention. They are, however, not to be construed as limitative since various modifications can be made in the light of the principles and guiding teachings contained herein.

*Example 1*

A 500 kilo portion of dry bacterial cells containing 98 grams vitamin $B_{12}$ (196 mcgs. per gram) was treated as follows: 1500 liters of 80% aqueous isopropanol containing 15 kilos sodium metabisulfite (1% w./v.) was mixed with the 500 kilos of dry bacterial cells to form a smooth slurry. The pH of this slurry was then adjusted to pH 5.5 with sulfuric acid. The slurry was stirred vigorously for 45 minutes at 25 degrees C. and then filtered through a plate and frame filter press. 1150 liters dark red filtrate was recovered. This filtrate contained 35.7 grams vitamin $B_{12}$, or 36.4% of the original vitamin $B_{12}$ input. 1000 liters of 80% aqueous isopropanol containing 0.5% w./v. sodium metabisulfite were prepared and adjusted to pH 5.5 with sulfuric acid. This solvent was then passed through the filter cake in the filter press. 930 liters red filtrate was obtained which contained 23.7 grams vitamin $B_{12}$, or 24.2% of the original vitamin $B_{12}$ input. The filtrates were mixed together and were found to contain 59.5 grams vitamin $B_{12}$, or 60.6% of the original vitamin $B_{12}$ input.

The filter cake was air dried and ground to a free flowing light tan powder containing 38.5 grams vitamin $B_{12}$ (77 micrograms per gram).

The combined filtrates were evaporated in a still at a temperature not exceeding 70 degrees C. to approximately 5% of the original volume (105 liters). The resulting dark red sludge was cooled to 25 degrees C. Then the sludge was mixed with two volumes of water and allowed to stand for 15 minutes so that the fats thrown out of solution could rise to the surface. The fat scum was skimmed from the surface and discharded after washing with two 5 liter portions of water. The dark red water solution and washings were next filtered through a filter press precoated with "Celite 505" filter aid. The filter cake was washed with water until colorless. The filtrate (330 liters) and washings (25 liters) were found to contain a total of 53 grams vitamin $B_{12}$. 330 grams sodium metabisulfite (0.1% w./v.) were added to the filtrate and the pH of the filtrate was adjusted to 5.5 to stabilize the vitamin $B_{12}$ content. The washings were treated in a like manner.

An adsorption column was prepared by acidifying activated alumina to pH 4.0 with sulfuric acid and packing this material into a tank to form a 15 gal. capacity column. After washing the column with five volumes of water, the aqueous filtrate was passed through the column followed by the filter cake wash water. The column was water washed until the effluent was colorless. The activated alumina, discolored with non-$B_{12}$ impurities, was discarded, although treatment with 10 normal sodium hydroxide and reacidification has been found useful to prepare the column for the treatment of further batches of crude vitamin $B_{12}$ material.

The effluent from the alumina column (380 liters) contained 51.2 grams vitamin $B_{12}$. After adjusting the effluent pH to 4.5, the vitamin $B_{12}$ was subjected to two solvent-solvent transfers using solvents such as phenol-benzene, n-butanol and chloroform, according to known and published techniques. After washing the final aqueous solution with chloroform-acetone in 55-45 part mixture, the aqueous solution was evaporated at 37 degrees C. to a heavy red sirup.

This heavy red sirup contained 43.4 grams vitamin $B_{12}$. The total solids content was 3.58% indicating that vitamin $B_{12}$ constituted 15.7% of the total solids content. The red sirup was mixed with mannitol to provide a final dry powder analyzing 1000 mcgs. vitamin $B_{12}$ per gram by the U.S.P. microbiological assay. The pink dry powder was found to be elegant in appearance, and was eminently suitable for pharmaceutical use as oral grade vitamin $B_{12}$ solids.

Alternatively, the heavy red sirup is well suited for further purification to the crystalline state, and serves as a preferred raw material for this use.

*Example 2*

A 100 ml. portion of whole fermented bacterial culture containing 0.9% cell solids and 510 mcgs. vitamin $B_{12}$ was filtered with Filter Cel by suction to obtain a moist filter cake. The filter cake containing all of the bacterial cells and the vitamin $B_{12}$ was then mixed with three volumes of 90% isopropanol (64 ml.) containing 1% sodium metabisulfite (w./v.). (The water content of the filter cake normally reduces the concentration of isopropanol to 80%). The pH was adjusted to 5.5 with sulfuric acid. The suspension was then heated to 75 degrees C. and stirred vigorously for 30 minutes. After cooling to room temperature and centrifuging, 60 ml. of clear orange-red supernatant were obtained which contained 292 mcgs. vitamin $B_{12}$. The extraction was repeated once with 42 ml. of fresh 90% isopropanol. 40 ml. of clear orange-red supernatant were obtained which contained 171 mcgs. vitamin $B_{12}$. The combined supernatants containing 463 mcgs. of vitamin $B_{12}$ were then evaporated to 5% of the original volume and purified by a similar procedure as detailed in Example 1.

*Example 3*

1000 ml. of whole fermented bacterial culture was concentrated by centrifuging, resulting in 100 ml. of bacterial cell cream. This portion of concentrated bacterial cell cream, containing 2150 mcgs. vitamin $B_{12}$, was treated as follows: The concentrated bacterial cell cream was mixed with 2 volumes (200 ml.) of 99% isopropanol. Sodium metabisulfite was added to obtain a concentration of 1% w./v. in the extraction mixture and the pH was then adjusted to 5.5 with sulfuric acid. The mixture was heated to 75 degrees C. and stirred vigorously for 30 minutes. Upon cooling to room temperature the cellular material coagulated and settled out. The cellular material was separated by centrifuging. 270 ml. clear red supernatant were obtained which contained 1830 mcgs. vitamin $B_{12}$. The extraction was repeated once with 100 ml. 90% isopropanol. 101 ml. clear orange supernatant were obtained which contained 230 mcgs. vitamin $B_{12}$. The combined supernatants containing 2060 mcgs. vitamin $B_{12}$ were then evaporated to 5% of the original volume and purified by a similar procedure as detailed in Example 1.

What I claim as new and desire to protect by Letters Patent of the United States is:

1. In a method of extracting vitamin $B_{12}$ from an organic solvent extract of microbial materials containing vitamin $B_{12}$, the steps which comprise evaporating said organic solvent extract to not in excess of about 15% of its original volume, then adding thereto a quantity of water sufficient to effectuate separation of undesired impurities, and then removing the desired liquid portion containing the vitamin $B_{12}$ from said undesired impurities.

2. In a method of extracting vitamin $B_{12}$ from an organic solvent-water extract of microbial materials containing vitamin $B_{12}$, in which said organic solvent comprises a saturated aliphatic alcohol containing from 1 to 3 carbon atoms with the water being present in a minor proportion, the steps which comprise evaporating said organic solvent extract to not in excess of about 15% of its original volume, then adding thereto from about 1 to 4 volumes of water to effectuate separation of undesired impurities, and then removing the desired liquid portion containing the vitamin $B_{12}$ from said undesired impurities.

3. In a method of extracting vitamin $B_{12}$ from an organic solvent-water extract of microbial materials containing vitamin $B_{12}$, in which said organic solvent comprises isopropanol and water, the water comprising from about 10% to about 30% by volume of said organic solvent-water extract, the steps which comprise evaporating said organic solvent extract to not in excess of about 15% of its original volume at a reduced pressure and at a temperature not in excess of about 70 degrees C., then adding thereto from about 1 to 4 volumes of water to effectuate separation of undesired impurities, and then removing the desired liquid portion containing the vitamin $B_{12}$ from said undesired impurities.

4. In a method of extracting vitamin $B_{12}$ from an organic solvent-water extract of microbial materials containing vitamin $B_{12}$, the steps which comprise evaporating said organic solvent extract to about 5% to 15% of its original volume at a reduced pressure and at a temperature not in excess of about 70 degrees C., then adding thereto from about 1 to 4 volumes of cold water to effectuate separation of undesired impurities, and then removing the desired liquid portion containing the vitamin $B_{12}$ from said undesired impurities.

5. In a method of extracting vitamin $B_{12}$ from an isopropanol-water extract of microbial materials containing vitamin $B_{12}$, in which the water content is from 5% to 40% by volume of the isopropanol-water mixture, the steps which comprise evaporating said extract to about 5% to 10% of its original volume at a reduced pressure and at a temperature not in excess of about 70 degrees C., and then adding thereto from about 2 to 3 volumes of cold water to effectuate separation of undesired impurities, and then removing the desired liquid portion containing the vitamin $B_{12}$ from said undesired impurities.

6. In a method of extracting vitamin $B_{12}$ from dry microbial materials containing the same, the steps which comprise agitating said microbial materials in admixture with an extracting medium comprising a solution of water in a saturated aliphatic alcohol containing from 1 to 3 carbon atoms, the water content of said solution ranging from about 10% to about 30% by volume, to effect extraction of the vitamin $B_{12}$, separating the solids from the liquid portion, evaporating said liquid portion to not in excess of about 15% of its original volume, adding thereto a quantity of water sufficient to effectuate separation of undesired impurities, and then removing the desired liquid portion containing the vitamin $B_{12}$ from said undesired impurities.

7. The method of claim 6, which comprises including in said aliphatic alcohol-water solution a small proportion of a compound furnishing an ion of the class consisting of sulfite and cyanide ions whereby to effect stabilization of vitamin $B_{12}$ variant forms.

8. In a method of extracting vitamin $B_{12}$ from microbial materials containing the same, the steps which comprise agitating 1 part of said microbial materials in admixture with at least several parts, by weight, of a mixture of water and isopropanol, the water content of the extraction mixture ranging from about 5% to about 40% by volume of the total mixture of the water and the isopropanol, to effect extraction of the vitamin $B_{12}$, separating the solids from the liquid portion, evaporating said liquid portion to not in excess of about 15% of its original volumn, adding thereto from about 1 to about 4 parts of water per 1 part of said evaporated liquid, said parts being by weight, whereby to effectuate separation of undesired impurities, and then removing the desired liquid portion containing the vitamin $B_{12}$ from said undesired impurities.

9. The method of claim 8, which comprises including in said isopropanol-water solution a small proportion of a compound furnishing an ion of the class consisting of sulfite and cyanide ions whereby to effect stabilization of vitamin $B_{12}$ variant forms.

10. In a method of extracting vitamin $B_{12}$ from dry microbial materials containing the same selected from the group consisting of dried bacteria cells and dried fermentation residues, the steps which comprise agitating said microbial material in admixture with an extracting medium comprising a solution of water in isopropanol, the water content of said solution ranging from about 10% to about 30% by volume, to effect extraction of the vitamin $B_{12}$ separating the solids from the liquid portion, evaporating said liquid portion to approximately 5% to 15% of its original volume, adding thereto from about 1 to about 4 parts of water per 1 part of said evaporated liquid, said parts being by weight, whereby to effectuate separation of undesired impurities, and then removing the desired liquid portion containing the vitamin $B_{12}$ from said undesired impurities.

11. The method of claim 10, which comprises including in said isopropanol-water solution a small proportion of a compound furnishing an ion of the class consisting of sulfite and cyanide ions whereby to effect stabilization of vitamin $B_{12}$ variant forms.

12. In a method of extracting vitamin $B_{12}$ from microbial materials containing the same, the steps which comprise agitating 1 part of said microbial materials in admixture with at least several parts, by weight, of a mixture of water and a saturated aliphatic alcohol containing from 1 to 3 carbon atoms, the water content of the extraction mixture ranging from about 5 to about 40% by volume of the total mixture of the water and said alcohol, to effect extraction of the vitamin $B_{12}$, separating the solids from the liquid portion, evaporating said liquid portion to approximately 5% to 15% of its original volume, adding thereto from about 1 to about 4 parts of cold water per 1 part of said evaporated liquid, said parts being by weight, whereby to effectuate separation of undesired impurities, and then removing the desired liquid portion containing the vitamin $B_{12}$ from said undesired impurities.

References Cited in the file of this patent

UNITED STATES PATENTS

| | | |
|---|---|---|
| 2,530,416 | Wolf | Nov. 21, 1950 |
| 2,595,159 | Meyer | Apr. 29, 1952 |
| 2,683,680 | McCormick | July 13, 1954 |
| 2,694,667 | Phelps | Nov. 16, 1954 |

FOREIGN PATENTS

| | | |
|---|---|---|
| 682,329 | Great Britain | Nov. 6, 1952 |